United States Patent
Huai (10) Patent No.: US 10,365,648 B2
(45) Date of Patent: *Jul. 30, 2019

(54) METHODS OF CUSTOMIZING SELF-DRIVING MOTOR VEHICLES

(71) Applicant: Xiaoning Huai, Sunnyvale, CA (US)

(72) Inventor: Xiaoning Huai, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/662,282

(22) Filed: Jul. 28, 2017

(65) Prior Publication Data

US 2017/0336791 A1 Nov. 23, 2017

Related U.S. Application Data

(63) Continuation of application No. 15/640,528, filed on Jul. 1, 2017, now abandoned.

(30) Foreign Application Priority Data

Jun. 26, 2017 (CN) .......................... 2017 1 0490689
Jul. 13, 2017 (CN) .......................... 2017 1 0568488

(51) Int. Cl.
  *G05D 1/00* (2006.01)
  *G05D 1/02* (2006.01)
  *B60W 50/00* (2006.01)

(52) U.S. Cl.
  CPC ....... *G05D 1/0088* (2013.01); *B60W 50/0098* (2013.01); *G05D 1/0214* (2013.01); *B60W 2050/0089* (2013.01); *B60W 2540/28* (2013.01)

(58) Field of Classification Search
None
See application file for complete search history.

(56) References Cited

U.S. PATENT DOCUMENTS

| | | | |
|---|---|---|---|
| 2015/0233719 A1* | 8/2015 | Cudak | B60R 25/01 701/23 |
| 2016/0161950 A1* | 6/2016 | Frangou | B60W 30/12 701/27 |
| 2016/0314224 A1* | 10/2016 | Wei | G05B 17/02 |
| 2017/0135621 A1* | 5/2017 | Lee | A61B 5/18 |
| 2017/0217445 A1* | 8/2017 | Tzirkel-Hancock | B60W 50/08 |
| 2017/0255966 A1* | 9/2017 | Khoury | G06Q 30/0266 |
| 2017/0267256 A1* | 9/2017 | Minster | G01C 21/3461 |
| 2018/0174446 A1* | 6/2018 | Wang | G08G 1/0133 |

OTHER PUBLICATIONS

Strong et al., "How will Autonomous Vehicle technologies affect driver liability and overall insurance?", IET Conferences, pp. 1-8, 2015 (Year: 2015).*
Rizaldi et al., "Formalising Traffic Rules for Accountability of Autonomous Vehicles", IEEE Conferences, pp. 1658-1665, 2015 (Year: 2015).*

(Continued)

*Primary Examiner* — Tamara L Weber (57) ABSTRACT

Methods for customizing the operation of a self-driving motor vehicle are disclosed that improve the applicability and performance of a self-driving motor vehicle by acquiring and applying user specific data sets in operation to realize user desired driving behaviors in different scenarios reflecting user preferred driving styles, and moral or ethics traits.

19 Claims, 5 Drawing Sheets

(56) References Cited

OTHER PUBLICATIONS

Ilkova et al., "Legal aspects of autonomous vehicles—an overview", 2017 21st International Conference on Process Control (PC), Jun. 6-9, 2017, Strbske Pleso, Slovakia (Year: 2017).*
Robert Peterson, "New Technology—Old Law: Autonomous Vehicles and California's Insurance Framework", 2012, Santa Clara University School of Law, p. 124-125 (Year: 2012).*
Terwilleger, "Navigating the Road Ahead: Florida's Autonomous Vehicle Statute and Its Effect on Liability", The Florida Bar Journal, Jul.-Aug. 2015, p. 27-34 (Year: 2015).*
Kash, "Nevada Issues Nation's First License for Self-Driven Car", May 8, 2012 (Year: 2012).*

* cited by examiner

Table 1.

| Response time to events / Factory/ Personalized settings | 0 - T1: The Blinking Zone | T1-T2: The Emergency Zone | T2 and beyond: The Cruise Zone |
|---|---|---|---|
| Factory settings | Per factory designs based on common behaviors | Per factory designs based on common behaviors | Per factory designs based on common behaviors |
| Impact of User preferences/profile data | Damage control options and alarm settings | Apply user preference data and moral or ethics traits vs the scenarios | Apply user preference data and driving styles vs the scenarios |

FIG.5

METHODS OF CUSTOMIZING SELF-DRIVING MOTOR VEHICLES

TECHNICAL FIELD

Artificial intelligence, self-driving motor vehicle, and robot.

BACKGROUND

Figure 1:
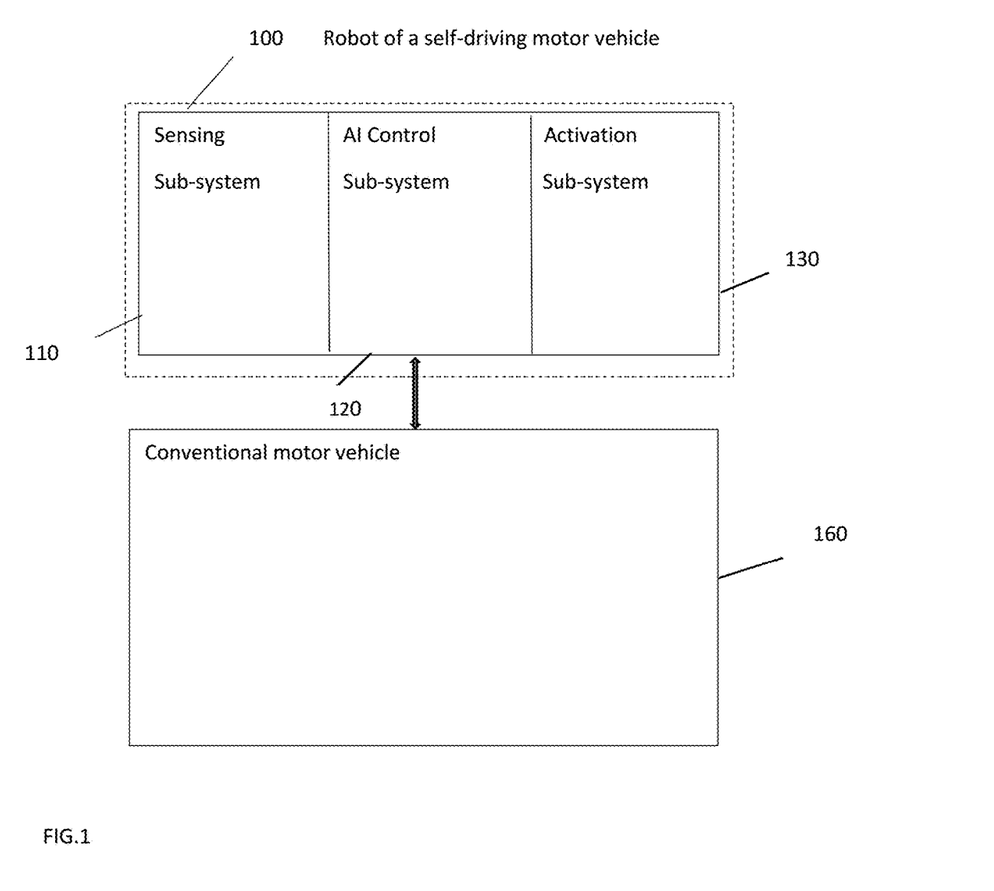
FIG. 1 Illustration of a functional structure of a self-driving motor vehicle.

AI (denotes artificial intelligence hereby and hereafter in this disclosure) based driving automation has evolved now to a stage of heavy premarketing road test by several self-driving motor vehicle manufacturers. Among other issues, accidents are occasionally reported calling for more improvements. A self-driving motor vehicle could be viewed as if a robot sits on a conventional motor vehicle, though it does not take the shape of what is commonly presented or perceived, comprising a sensing sub-system, an AI control sub-system and an activation sub-system, while the conventional motor vehicle should be altered significantly for a better integration, as illustrated in FIG. 1. A self-driving motor vehicle drives itself from one start point to a destination set by a user (denotes an owner or a passenger or rider who rides or uses the self-driving motor vehicle hereby and hereafter in this disclosure) or a remote controller through a wireless communication system or an electronic media device and guided by an automatic navigational system with or without involving a user in the vehicle. It can carry one or more passengers or no passengers, for example when it is sent for a passenger. The robot conducts real-time scene analysis of roadway and traffic events, interprets and applies the traffic rules wherever it is driving, and synchronizes activation subsystem to make the driving for a user. A robot on the self-driving motor vehicle has been trained and learned the general skills and rules of a motor vehicle operation. However, driving as a human activity has many attributes than just moving or transportation, such as safety, comfort, exercise, sport and so on, which vary according to each user's experiences, favors, moral and ethics traits among other things. In case of an emergency or an accident, different users tend to have different preferred operation behaviors by the self-driving motor vehicle, concerning responsibilities, liabilities, and damage controls to different parties involved, among other issues of conflicting interest. Obviously, it would be very difficult if ever possible for a self-driving motor vehicle with generic factory settings to render the preferred operation behaviors for every individual user. From the vehicle operation point of view, a fundamental difference between a conventional and a self-driving motor vehicle is that the former only provides an essential platform for a user to exercise the operation, while the latter tries to provide a ubiquitous platform essentially without involving a user in its operation. Although there have been vigorous researches and designs for a self-driving motor vehicle to adapt to a user after it is on the road in state of the art technologies, the applicant believes a user customization in engineering or production, or before a self-driving motor vehicle starts the service could help resolve some of the controversial issues, reduce complexity of the design and the time to market, as well as improve its applicability, performance and user satisfaction.

SUMMARY OF THE INVENTION

Disclosed hereby a method of customizing a self-driving motor vehicle comprising the steps of: acquiring data of the user in the user preference data set and/or in the user profile data set; identifying a current user; applying the data of the current user in the user preference data set and/or in the user profile data set in operating the vehicle; updating the data of the current user in the user preference data set and/or the user profile data set of the current user during the driving; and applying the updated data of the current user in the user preference data set and/or in the user profile data set in operating the vehicle.

DETAILED DESCRIPTION OF THE INVENTION

The following descriptions and illustrated example embodiments are intended to explain the invention without limiting the scope of this invention.

Figure 2:
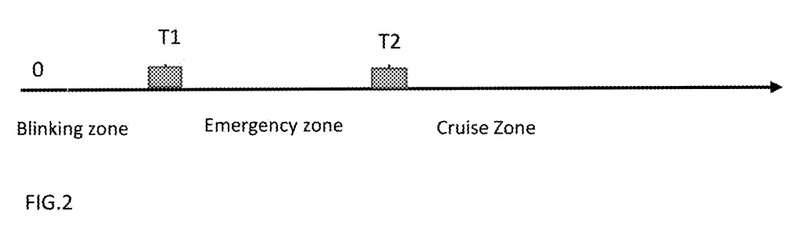
FIG. 2 Illustration of categorized response time interval to roadway and traffic events, the shaded area around T1 and T2 indicate it should be considered as a zone with a boundary varying from model to model, and from time to time.

The robot of a self-driving motor vehicle keeps monitoring the roadway and traffic as well as the vehicle conditions by its sensing sub-system, and any events prompting for a responding adjustment of its operation will be analyzed to fall into one of the three conceptually categorized response time intervals, taking into account the distance of an involved object to and the speed of the vehicle, the time needed for the robot to run algorithms and activation sub-system, and for the activation to take effect, as illustrated in FIG. 2. The parameters separating the zones are a range of values overlapping between the adjacent zones, and are vehicle model dependent and scenario dependent. The interval between time 0 to T1 is hereby referred to as The Blinking Zone, wherein the robot can virtually do little or nothing to address an event or avoid an accident except to minimize the damages and send out alarms if there is an accident. The interval between T1 to T2 is referred to as The Emergency Zone, wherein actions could be taken to address an event or avoid an accident or let an accident happen in one way or another that would put different risks of damages to the user, the vehicle of the user and/or other parties who are involved in the accident, such as other vehicles or pedestrians who happens to share the roadway at the time. The interval from T2 beyond is referred to as the Cruise Zone, wherein the roadway and traffic events are easily manageable and chance of an accident is very small. Corresponding to each interval, there are sets of data acquired reflecting choices of a user or users on preferred behaviors in different scenarios, preferred driving styles, and/or moral or ethics traits, which will be used by the robot in its control of the operations, a process hereby referred to as customizing self-driving and is detailed below.

There are two data sets in a data base accessible by the AI control sub-system of the robot of the self-driving vehicle, the user preference data set, and the user profile data set. The user preference data set comprise entries of all users, wherein each entry matches a specific user with data in the form of a list or another type of data structure of scenario/user choice pairs. The user profile data set comprises entries of all users, wherein each entry matches a specific user with data in the form of a structure comprising a user background section and a user traits section. The scenario in a scenario/user choice pair comprises a description of a snapshot of road way, traffic and the vehicle state or a sequence of the snapshots, and/or a classified, encoded computational data representation of the description. The user choice of a scenario/user choice pair comprises the user preferred behavior of the vehicle operation in the scenario, and/or a classified, encoded computational data representation of the user preferred behavior. The background section of the user profile data comprise a description of personal information data of the user such as age, gender, body height, body weight, profession, marriage status, living area, education level, searchable public records such as of driving, medical, disability, insurance, credit, and crimes, or a classified, encoded computational data representation of the description, while the traits section comprises a description of the driving and/or riding styles, and/or the moral or ethics of the user or a classified, encoded computational data representation of the description.

Figure 3:
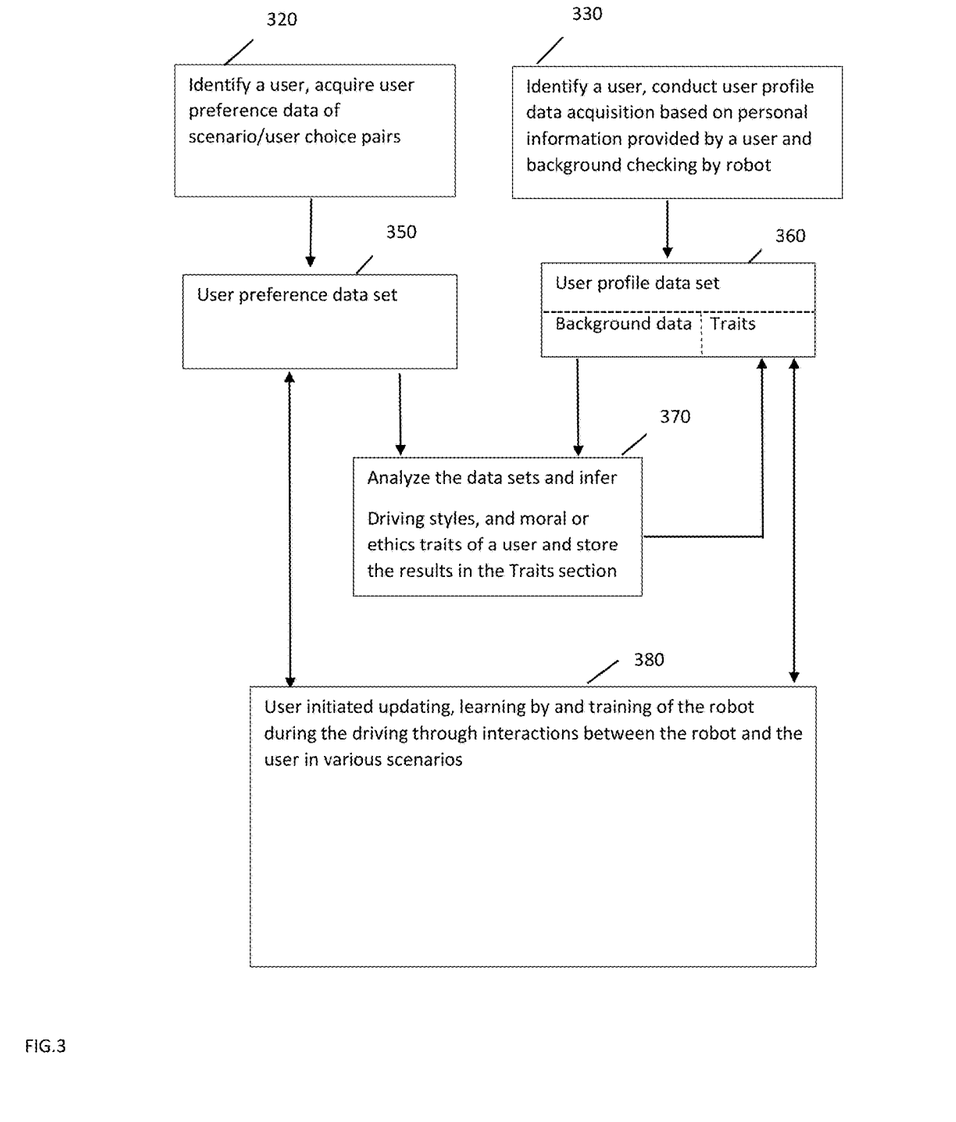
FIG. 3 Illustration of the procedures to customize a self-driving motor vehicle.

Customizing self-driving starts by an initialization process, which takes place before the vehicle is started or used for driving on a public roadway, using an interactive interface to communicate between the user and the robot of a self-driving motor vehicle as illustrated in FIG. 3. The robot identifies a user first for example, by a user ID/password. Then, the presenting to the user one scenario at a time from a training collection of scenarios and one or more selectable vehicle operating behaviors corresponding to each of the scenarios, obtaining a choice by the user on the preferred behavior in each of the scenarios, and storing each and every scenario/user choice pair in the entry of the user in the user preference data set; or receiving obtained data in the entry of the user in the user preference data set, or combining the obtaining and the receiving, and confirming and/or updating the data prior to the vehicle being used in a public roadway.

The above training collection of pairs of scenarios and vehicle operation behaviors in each of the scenarios should be verifiable or have been verified by simulation and/or road tests. Since it is very difficult and lengthy to cover all possible scenarios, some generalization and categorization of scenarios are necessary, and a numeric value within a normalized range indicating a percentage degree of a consent or discontent to a choice of answer is optionally used. The interactive interface between the robot and the user could be of a visual media such as a touch screen panel for display and input, or an audio media such as a speaker announcement combined with a microphone and a speech recognition module to take the inputs, or a combination thereof, for users without vision or hearing disabilities. For user with disabilities, however, an assistant to the user could help with the initialization to use the above interactive interfaces, or an adaptive device could be designed and installed.

In addition to the user preference data set, the background section of the user profile data set could also be acquired between the robot and a user using an interactive interface before or at the time of purchasing or requesting a service of a self-driving motor vehicle based on information provided by a user and/or research by the robot through a wireless communication system or an electronic media device.

The robot determines the traits of the user based on analyzing the acquired data in the two sets and data from behavior modeling, factory tests and user statistics by its AI control sub-system, and stores the data results in the traits section of the entry of the user in the user profile data set. Alternatively, both data sets could be partially or fully acquired prior to purchasing or using the service of a self-driving motor vehicle between a user and a manufacturer, a vender or a service provider and delivered to the robot of a self-driving motor vehicle, which will be confirmed and updated if necessary between the robot and a current user before the vehicle is used and moves to a public roadway.

Figure 4:
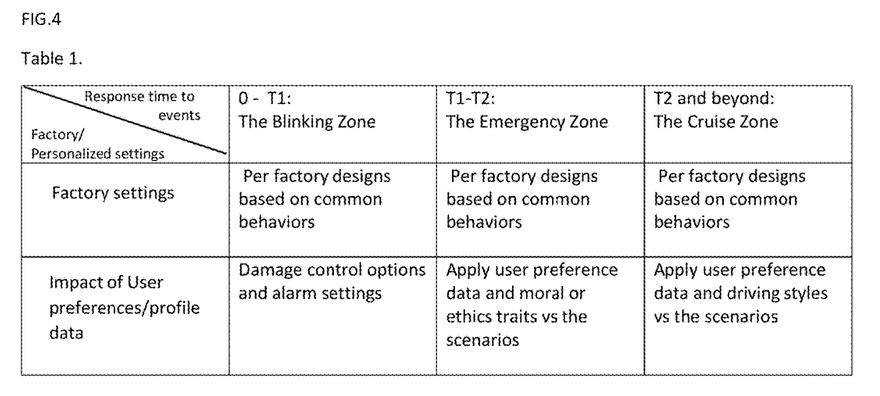
FIG. 4 Table 1, Example impacts on operation by the user preference data.

An example of impact on operation by user preference data is illustrated in FIG. 4 Table 1. Since how to handle events in the Emergency Zone between T1 and T2 is most critical and controversial to the safety behavior of a self-driving motor vehicle, some examples are designed and given below as an illustration of scenarios/user choice data pairs.

Example 1: A self-driving motor vehicle is driving on a roadway at a normal speed approaching an intersection with a green light, a bicycle suddenly runs red light from one side of the roadway appearing in front of the self-driving motor vehicle. The robot finds braking the vehicle is too late to avoid the accident, but swing the vehicle to the left or right might have a chance, which would violate the traffic rules by running into a wrong lane and have a chance to damage the self-driving motor vehicle, which would be your choice:
  A. Brake the vehicle
  B. Swing the vehicle.

Example 2: At what risk degree between 0 and 1 would you take to damage your vehicle or harm yourself to avoid running over pedestrians (0 indicates none, 1 indicates full)?
  A. 0
  B. 1
  C. 0.5
  D. Undecided.

Example 3: When a collision between the self-driving motor vehicle and another vehicle is unavoidable, which of the following would you choose?
  A. Minimize the damage to yourself no matter what happens to the other party
  B. Minimize the damage to yourself no matter what happens to the other party if the other party has the liability
  C. Take some risk of damaging yourself depending the circumstances to reduce the damage to the other party.

Example 4: When an accident is unavoidable, which of the following would you choose?
  A. Minimize the damage to the passenger sitting on the front-left seat
  B. Minimize the damage to the passenger sitting on the back-right seat
  C. Minimize the damage to myself no matter where I am sitting.

Example 5: Your preferred driving style in highway is:
  A. Smooth and steady
  B. Swift and jerky
  C. Aggressive with sport flavor.

Figure 5:
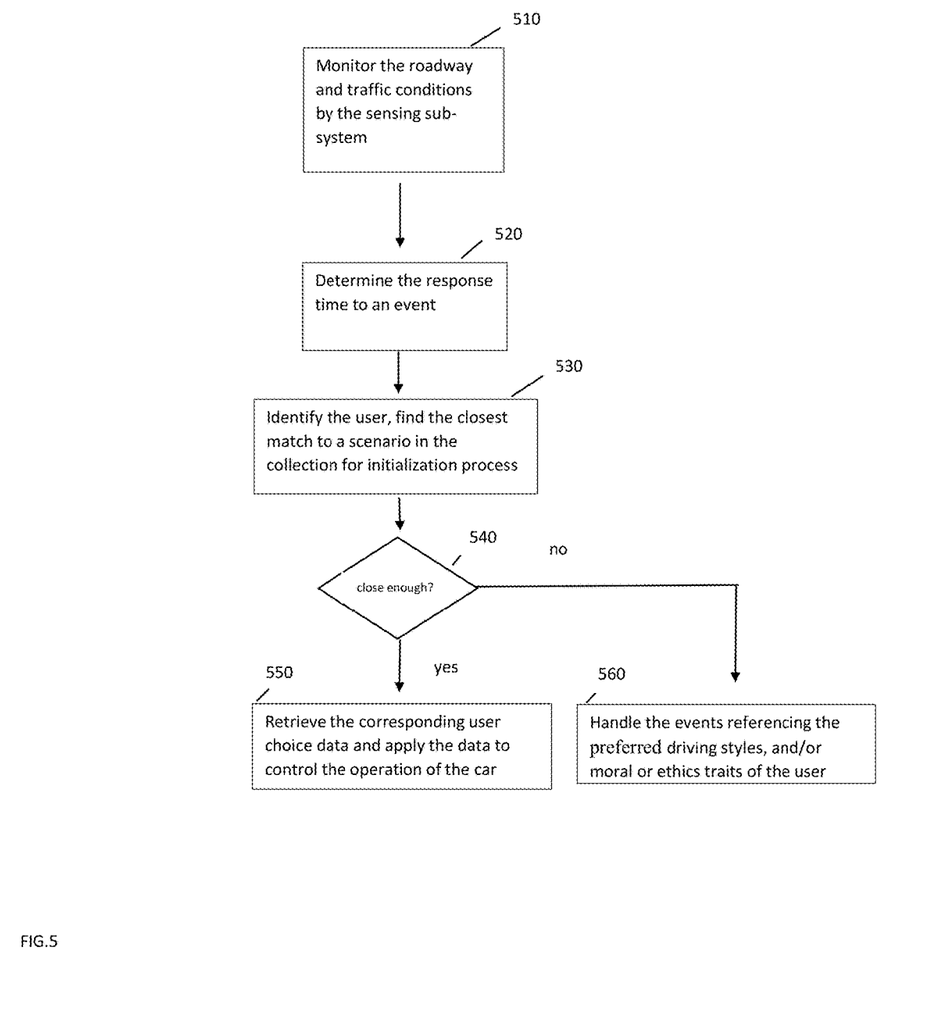
FIG. 5 Illustration of how to apply user data in self-driving.

An illustration to how to apply these data for real time operation is in FIG. 5. The robot needs to identify a current user, and use the data in the entry of the current user in the user preference data set, and in the user profile data set to assist its operation. In the first place, a self-driving motor vehicle should follow the traffic rules and other laws regarding a vehicle operation. In respond to a scenario during the driving, the robot runs scenario matching first to find the closest match between the current scenario and a scenario used in the training collection for acquisition of the user preference data, and apply the user choice data operating the vehicle if the match is close enough. However, when a close enough match could not be found, the robot refers to the user traits data in the entry of the user in the user profile data set to generate a suggestion how to handle the scenario and achieve an optimal solution by considering it together with other options generated by AI control subsystem based on non-user-specific analysis. So, there is a clear difference between how to use these two sets of user data.

Below is an example embodiment how to apply the user preference data set in vehicle operations:

Assuming a scenario is represented by a digitally encoded data structure in the form of C(R,T,V), wherein R represents a encoded categorized digital data of roadway condition (such as a highway or a local street in a city); T represents a encoded categorized digital data of traffic condition (such as vehicle flow rate indicating the sparsity or congestion of the traffic), and V a encoded categorized digital data of the self-driving vehicle condition (such as model, speed and passenger numbers and conditions), Let $Ci(Ri,Ti,Vi)$ represent a scenario in the user preference data set, and the total number of scenarios is n, wherein $Ri, Ti, Vi$ is a real number between 0 and 1 respectively, and its value is assigned proportional to the risks to the safety of the vehicle operations, normalized by $\Sigma_{i=1}^{n} Ri=1; \Sigma_{i=1}^{n} Ti=1; \Sigma_{i=1}^{n}=1$.

Let $C0(R0,T0,V0)$ represent a current scenario, and the scenario similarity S is calculated as:

$$S = \left( \frac{(Ri-R0)^2 * \alpha + (Ti-T0)^2 * \beta + (Vi-V0)^2 * \gamma}{3} \right)^{0.5}, \quad [1]$$

wherein $\alpha$, $\beta$, and $\gamma$ are risk weighting factors in the range between 0 and 1, and it is obvious the smaller S, the higher similarity.

Applying [1] to find the minimum scenario similarity Smin among all the scenarios in the entry of the current user in the user preference data set, and if Smin is smaller than a threshold value St1, it is assumed the current scenario matches a scenario in the user preference data set, and the corresponding user choice to the scenario is used in operating the vehicle.

If a scenario match could not be found, a suggestion is generated based on the traits of user for operation of the vehicle for example by categorizing the traits of a user into one of the following groups in response to events in the Emergency Zone:

A. Habitual traffic violation offenders
B. Strict traffic rule followers
C. Smart and flexible drivers
D. Altruism volunteer heroes While classifying an individual user to above categories or another type of categorization from the acquired user data and behavior modeling may not be fully objective and accurate, generating from each category a suggestion on a preferred behavior of the vehicle operation is also only of a probability nature. For example, in the Example 1 of the previously listed five example scenarios, although there is tendency with a high probability for traits B group users to select the answer A "brake", while traits C group users might select the answer B "swing", it should not be assumed to be an affirmative action. For events in the Cruise Zone, a categorization based on user driving styles in Example 5 is as follows:

A. Smooth and steady
B. Swift and jerky
C. Aggressive with sport flavor which could be rendered in the vehicle operations in favor of a user choice or style when it is safe and lawful.

Certain restrictions are applied as a default setting for the self-driving motor vehicles in general. For example, since this disclosure is not concerned about the application to use the driver-less technology as a battle vehicle in a war or as a vehicle for law enforcement, the self-driving motor vehicle is to be inhibited to be engaged in any offensive action against any third parties, including pedestrians, other vehicles etc. It should also be barred from any self-destruction behavior such as running out of a cliff or against a road barrier or walls of a building, unless the AI control subsystem of the robot determines such a move is necessary for reducing the seriousness of an otherwise unavoidable accident and the user has optioned such a choice in the user preference data set. Although in general, applying the user preference data and the user profile data is intended to satisfy the experience and expectation of a user, there are exceptions on the contrary, for example, if a user riding the vehicle is found to be drunk by an alcoholic sensor, or to be a habitual reckless driving offender, certain functions such as user overriding the robot for manually operating the vehicle should be restricted.

When multiple users are riding a self-driving motor vehicle, it is optional to select one of the riders as the current user and applies the user preference data and the user profile data of the current user in assisting the operation of the vehicle. In case there is no passenger riding the vehicle, a default or selective set of factory settings, or the user preference data and user profile data of a designated user could be used in assisting the vehicle operation.

A continuing user customization by user adaptation and learning during the driving is illustrated in FIG. 3 by module 380, particularly if the user is a recurrent one such as an owner of the vehicle. In a first example embodiment, the robot prompts messages or make announcements, through visual, sound or other types of media about an unfamiliar or untrained or hazardous roadway and traffic condition, asks for guidance or command from the user, evaluates and executes the guidance or command assisting the operation upon receiving the guidance or command. Then the robot conducts evaluation of the effect or performance of the operation, if the performance is satisfactory and no accidents happen, generates a description of the scenario from the driving records, and takes the guidance or command as the user choice and inserts the resulting scenario/choice pair into the user entry of the user in the user preference data set. The updated user preference data set could be checked and used to update the traits section of the user profile data, and both updated sets will be applied in the next driving. In a second example embodiment, the user could also take over the driving physically when necessary and if it is feasible in the design, or take initiatives to direct driving behavior of the robot through an interactive interface, and a similar process to that used in the first example embodiment could be used to update the two user data sets. Moreover, the robot could chat with a user through a user interface and/or use a gaze, gesture or other monitoring techniques to detect and analyze the user's verbal, tactile or body languages reflecting his or her experiences or sentiments during the driving, and tune its operation accordingly, and the process could be used to expand or update the two data sets whenever applicable by a similar way as in the first example embodiment. Thereby, a customer matched operation of a self-driving motor could be accomplished and incrementally improved.

Moreover, the methods disclosed hereby could help resolve some of the controversial legal and/or moral issues including but not limited to those illustrated in the example scenario/user choice pairs. For instance, the manufacturer or the service provider or the insurance provider of a self-driving motor vehicle with default factory settings is usually supposed to assume all liabilities for the vehicle to be used in a public roadway. However, acquiring and applying the scenario/user choice pairs in the user preference data set establishes a commitment from both the vehicle and the user, wherein if the vehicle faithfully executes a user choice in a scenario, the user would assume at least partial responsibilities for the consequences of the operation, which could result in additional benefits of reduced areas of uncertainties and complexities in the system design. As indicated earlier, the training collection used for acquiring data of scenarios/user choice pairs in the user preference data set should be verifiable and/or verified by simulation and/or road tests and lawful, which could serve as a performance criteria data sheet complimenting other features sets of the vehicle evaluated by government regulatory agencies for issuing a vehicle and/or driver license or sales permit. Meanwhile, the acquired user preference data set and/or the user profile data set could be used to determine the conditions and/or qualifications for a user to purchase or use the service of such a vehicle.

In all, the methods disclosed hereby should find them applicable and implementable by ordinary skilled professionals in the field, and the applicant would like to claim the rights and benefits to the scope of the invention.

What is claimed is:

1. A method of customizing a self-driving motor vehicle comprising the steps of: acquiring a user preference data set and a user profile data set;
    identifying a current user;
    applying data of the current user in the user preference data set and in the user profile data set in operating the vehicle;
    updating the data of the current user in the user preference data set and the user profile data set of the current user during driving;
    applying the updated data of the current user in the user preference data set and in the user profile data set in operating the vehicle;
    driving the vehicle based on the updated data of the current user in the user preference data set and in the user profile data set;
    wherein the step of applying the data comprises:
    finding a closest match between a current scenario and a scenario used in a training collection for acquiring data in the entry of the current user in the user preference dataset;
    applying a user choice in the current scenario operating the vehicle if
    minimum scenario similarity is smaller than a threshold value; or
    generating a suggestion how to handle the current scenario based on the data in the entry of the current user in the user profile data set and
    achieving an optimal solution by considering the suggestion together with other options generated by AI control subsystems based on non-user-specific analysis.

2. The method of claim 1, wherein the step of acquiring a user preference data set comprises:
    identifying a user;
    obtaining the data of the user in the user preference data set by an initializing process including:
    presenting to the user one scenario at a time from a training collection of scenarios and one or more selectable vehicle operating behaviors corresponding to each of the scenarios; obtaining a choice by the user on the preferred behavior in each of the scenarios; and storing every scenario/user choice pair in the entry of the user in the user preference data set; or
    receiving obtained data in the entry of the user in the user preference data set; or combining the obtaining and the receiving; and
    confirming and/or updating the data prior to the vehicle being used in a public roadway.

3. The method of claim 2, wherein the training collection of scenarios comprises a categorization into segments of a blinking zone, an emergency zone and a cruise zone based on the estimated response time of the vehicle to events.

4. The method of claim 2, wherein the training collection is verifiable and/or verified by simulation and/or road tests.

5. The method of claim 1, wherein the step of acquiring a user profile data set comprises:
    identifying a user;
    obtaining data in a background section from personal information provided by the user and/or by researching public records and storing the obtained data in the background section in the entry of the user in the user profile data set;
    extracting data of the traits of the user based on the data in the entry of the user in the user preference data set and/or data in the background section in the entry of the user in the user profile data set and storing the extracted data in the traits section in the entry of the user in the user profile data set; or
    receiving obtained data in the entry of the user in the user profile data set; or combining the obtaining, extracting and receiving; and
    confirming and/or updating the data in the user profile data set prior to the vehicle being used in a public roadway.

6. The method of claim 1, wherein the step of identifying a current user comprises identifying a current rider, the current rider being a user having acquired data in the user preference data set and/or the user profile data set.

7. The method of claim 1, wherein applying the user choice in the current scenario comprises the user assuming at least partial responsibility for the consequences of the operation.

8. The method of claim 1, wherein the step of updating the data of the current user comprises a robot executing guidance or command by the current user in the current scenario in operation of the self-driving motor vehicle;
    conducting an evaluation of the effect of the operation;
    generating a description of the current scenario from driving records if the performance is satisfactory resulting in no accidents;
    taking the guidance or command as the user choice and inserting the resulting current scenario/user choice pair into the entry of the user in the user preference data set; and
    extracting user traits data and updating the entry of the user in the user profile data set; and/or
    a robot recording and analyzing current scenarios and behaviors of physical driving by the current user;

conducting an evaluation of the performance of the operation;

generating a description of each current scenario from the recording and analyzing if the performance is satisfactory resulting in no accidents;

extracting user choice data from the recording and analyzing; and updating the entry of the current user in the user preference data set and/or in the user profile data set; and/or a robot interacting with the user through a multi-media device;

accepting comments from the current user and/or automatically detecting facial and/or body languages of the current user reflecting the experience and/or the sentiment of the current user;

tuning the operations of the vehicle;

extracting data from the interacting, detecting and tuning; and updating the data in the entry of the current user in the user preference data set and/or in the user profile data set.

9. The method of claim 1, further comprising using the acquired data of the current user in the user preference data set and/or in the user profile data set before and/or during a vehicle service to determine how to provide the vehicle service to the current user.

10. A method of customizing a self-driving motor vehicle comprising steps of: acquiring a user preference data set and a user profile data set;

identifying a current user;

applying data of the current user in the user preference data set and in the user profile data set in operating the vehicle;

updating the data of the current user in the user preference data set and the user profile data set of the current user during driving;

applying the updated data of the current user in the user preference data set and in the user profile data set in operating the vehicle; and driving the vehicle based on the updated data of the current user in the user preference data set and in the user profile data set;

wherein the step of acquiring a user preference data set comprises:

identifying a user;

obtaining the data of the user in the user preference data set by an initializing process including:

presenting to the user one scenario at a time from a training collection of scenarios and one or more selectable vehicle operating behaviors corresponding to each of the scenarios;

obtaining a choice by the user on the preferred behavior in each of the scenarios and storing every scenario/user choice pair in the entry of the user in the user preference data set; or receiving obtained data in the entry of the user in the user preference data set; or combining the obtaining and the receiving; and confirming and/or updating the data prior to the vehicle being used in a public roadway;

wherein the training collection of scenarios emprises an categorization into segments of a blinking zone, an emergency zone and a cruise zone based on the estimated response time of the vehicle to events.

11. The method of claim 10, wherein the training collection is verifiable and/or verified by simulation and/or road tests.

12. The method of claim 10, wherein the step of acquiring a user profile data set comprises:

identifying a user;

obtaining data in a background section from personal information provided by the user and/or by researching public records and storing the obtained data in the background section in the entry of the user in the user profile data set;

extracting data of traits of the user based on the data in the entry of the user in the user preference data set and/or data in the background section and storing the extracted data in a traits section in the entry of the user in the user profile data set; or receiving obtained data in the entry of the user in the user profile data set; or combining the obtaining, extracting and receiving; and confirming and/or updating the data in the user profile data set prior to the vehicle being used in a public roadway.

13. The method of claim 10 wherein the step of identifying a current user comprises identifying a current rider, the current rider being a user having acquired data in the user preference data set and/or the user profile data set.

14. The method of claim 10, wherein the step of applying the data of the current user comprises:

finding a closest match between a current scenario and one of the scenarios used in the training collection;

applying the user choice in the current scenario operating the vehicle if a match being found;

generating a suggestion how to handle the current scenario based on the data in the entry of the current user in the user profile data set if the match not found; and achieving an optimal solution by considering the suggestion together with other options generated by artificial intelligence control subsystems based on non-user-specific analysis.

15. The method of claim 14, wherein applying the user choice in the current scenario comprises the user assuming at least partial responsibility for the consequences of the operation.

16. The method of claim 10, wherein the step of updating the data of the current user comprises a robot executing guidance or command by the current user in a current scenario in operation of the vehicle;

conducting an evaluation of the effect of the operation;

generating a description of the current scenario from driving records if the performance is satisfactory resulting in no accidents;

taking the guidance or command as the user choice and inserting the resulting current scenario/user choice pair into the entry of the user in the user preference data set; and extracting user traits data and updating the entry of the user in the user profile data set.

17. The method of claim 10, wherein the step of updating the data of the current user further comprises a robot recording and analyzing current scenarios and behaviors of physical driving by the current user;

conducting an evaluation of the performance of the operation;

generating a description of each current scenario from the recording and analyzing if the performance is satisfactory resulting in no accidents;

extracting user choice data from the recording and analyzing; and updating the entry of the current user in the user preference data set and/or in the user profile data set.

18. The method of claim 10, wherein the step of updating the data of the current user further comprises a robot interacting with the user through a multi-media device;

accepting comments from the current user and/or automatically detecting facial and/or body languages of the current user reflecting the experience and/or the sentiment of the current user;

tuning the operations of the vehicle;

extracting data from the interacting, detecting and tuning; and     updating the data in the entry of the current user in the user preference data set and/or in the user profile data set.

19. The method of claim 10, further comprising using the acquired data of the current user in the user preference data set and/or in the user profile data set before and/or during a vehicle service to determine how to provide the vehicle service to the current user.

\* \* \* \* \*